United States Patent
LaRue

[11] Patent Number: 5,605,103
[45] Date of Patent: Feb. 25, 1997

[54] INTERNAL PITCH IMPELLER FOR A COAL BURNER

[75] Inventor: Albert D. LaRue, Uniontown, Ohio

[73] Assignee: The Babcock & Wilcox Company, New Orleans, La.

[21] Appl. No.: 526,292

[22] Filed: Sep. 11, 1995

[51] Int. Cl.[6] ..................................................... F23D 1/02
[52] U.S. Cl. ...................... 110/262; 110/264; 110/104 B; 431/159; 239/299; 239/518
[58] Field of Search ........................................ 110/262, 264, 110/104 B, 347; 431/159, 185; 239/222.11, 399, 504, 518

[56] References Cited

U.S. PATENT DOCUMENTS

| | | | |
|---|---|---|---|
| 2,158,521 | 5/1939 | Nahigyan | 431/185 |
| 2,335,188 | 11/1943 | Kennedy | 431/185 |
| 2,380,463 | 7/1945 | Poole | 110/104 |
| 4,348,170 | 9/1982 | Vatsky et al. | 431/188 |
| 4,397,295 | 8/1983 | Bakker | 431/185 |
| 4,457,241 | 7/1984 | Itse et al. | 110/347 |
| 4,523,529 | 6/1985 | Poll . | |
| 4,836,772 | 6/1989 | LaRue . | |
| 4,928,605 | 5/1990 | Suwa et al. . | |
| 5,249,535 | 10/1993 | Chung | 110/264 X |
| 5,347,937 | 9/1994 | Vatsky | 110/261 |

FOREIGN PATENT DOCUMENTS 806991 2/1981 U.S.S.R. ................................ 431/159

Primary Examiner—Edward K. Look
Assistant Examiner—Michael S. Lee
Attorney, Agent, or Firm—Daniel S. Kalka; Robert J. Edwards

[57] ABSTRACT

A coal burner with impeller for a furnace has a housing containing a plurality of sets of blades which direct the fuel from the coal nozzle into a plurality of non-intersecting flows directed obliquely towards the longitudinal axis of the housing. The non-intersecting flows create a fuel-rich devolatilization zone and an air-rich char burnout zone within the furnace and limit the flame length of the burner.

8 Claims, 2 Drawing Sheets

INLET

OUTLET

INTERNAL PITCH IMPELLER FOR A COAL BURNER

BACKGROUND OF THE INVENTION

1. Field of the Invention

The present invention relates, in general, to pulverized coal burners used in a furnace, and in particular, to a new and useful arrangement for controlling the flow of combined pulverized coal and primary air through the burner nozzle, in a manner which results in low emissions of nitrogen oxides ($NO_x$) and improved combustion efficiency.

2. Description of the Related Art

Pulverized coal-fired burners produce $NO_x$ emissions as a consequence of oxidation of fuel bound nitrogen found in coal (fuel $NO_x$), oxidation of nitrogen in the combustion air at elevated flame temperatures (thermal $NO_x$), and intermediate reactions of hydrocarbons with atmospheric nitrogen (prompt $NO_x$). The largest source of emissions is from fuel $NO_x$. These emissions can be reduced by altering the combustion process. Fuel nitrogen is released during the combustion of pulverized coal, during devolatilization and during char burnout. Fuel $NO_x$ is readily formed during devolatilization unless countermeasures are used, due to the high temperatures and abundance of oxygen available in the flame root. Fuel $NO_x$ formation tends to be less during char burnout since flame temperatures tend to decrease and oxygen partial pressure is reduced.

Conventional burners produce high levels of $NO_x$. These burners allow rapid complete mixing of the coal and combustion air, favoring $NO_x$ formation. Some of the most effective pulverized coal-fired burners for reducing $NO_x$ emissions are designed to control and limit oxygen availability during devolatilization. In essence the fuel is separated from the majority of the combustion air during this brief period, and then introduced downstream in the flame. Two examples of such burners are disclosed in U.S. Pat. Nos. 3,788,796 and 4,836,772. These burners typically reduce $NO_x$ emissions by 40 to 60% below uncontrolled levels.

Known low $NO_x$ burners, however, tend to have elongated flames due to the axial injection of the fuel jet and staged introduction of combustion air. This can result in flame impingement on furnace walls opposite the burner location, and associated problems with slagging and or furnace tube corrosion. In addition, low $NO_x$ burners tend to produce higher levels of unburned carbon due to delayed and/or incomplete mixing of air and fuel. Unburned carbon directly contributes to a reduction in boiler efficiency and increased operating costs. Elevated levels of unburned carbon can also substantially increase ash disposal costs.

In order to reduce these tendencies, some low $NO_x$ burner designs employ mixing devices at or near the exit of the burner nozzle. These devices, many of which are referred to as impellers, deflect the coal outwardly away from the burner centerline. These devices may impart radial deflection, swirl, or some combination thereof, on the flame.

A patent which discloses a flow diverting mechanism at the end of a burner nozzle, is U.S. Pat. No. 2,380,463, which uses conically diverting vanes for diverting the mixture of primary gas and pulverized coal outwardly away from the axis of the nozzle.

U.S. Pat. No. 4,348,170 discloses the use of a tapered tip in a burner for confining the flame used in conjunction with diverters for dividing secondary combustion air around the flame. However, there is no use of crossing streams of primary air plus pulverized coal immediately downstream of the burner nozzle.

U.S. Pat. No. 4,397,295 teaches directing air radially inwardly with a slight tangential component, toward a flame to shape and shorten the flame. A distinctive swirling and violent mixing effect would be achieved. A similar mixing effect would be achieved with the invention of U.S. Pat. No. 4,523,529.

U.S. Pat. No. 5,347,937 discloses dividing a fuel/air mixture into multiple streams which do not rapidly mix with each other for the purpose of enhancing the conditions that reduce $NO_x$ formation.

SUMMARY OF THE INVENTION

It is a primary object of the invention to provide an internal pitch impeller for use with a pulverized coal-fired burner to reduce $NO_x$ emissions and improve combustion efficiency.

Accordingly, the impeller has an internal pitch mechanism. The impeller is placed at the outlet of a pulverized coal nozzle for redirecting the flow of primary air and pulverized coal so that it is divided into a plurality of inwardly directed flow segments which do not intersect each other.

The impeller comprises a housing, which is preferentially cylindrical, containing several sets of blades arranged in segments around the longitudinal axis of the housing. The blades are pitched inwardly at an acute angle to the longitudinal axis.

The blades may be straight or curved and the number of blades used in each segment is advantageously chosen depending on the size of the coal nozzle. Thus, while an orientation of 12 blades is disclosed as a preferred embodiment, it is not intended to limit the scope of this invention.

The blades are oriented so that a number of flow streams equal to the number of sets of blade, are created by the impeller. Further, the orientation of the blades is such that the individual flow streams do not collide or bounce off each other.

In this way a fuel-rich environment is momentarily created immediately downstream of the burner nozzle which discourages the formation of $NO_x$, while at the same time promoting mixing further downstream improving combustion efficiency by lowering loss of ignition (LOI) and reducing the overall length of the flame so that it does not impinge upon the far wall of the furnace, causing premature erosion and damage.

It is a further object to divide the stream into multiple flow portions which are diverted inwardly toward the axis of the nozzle but which do not cross each other. Crossing of the paths would cause undesirable dispersion and expansion of the flame, increasing oxygenation and defeating the fuel rich environment which is advantageous immediately downstream of the nozzle.

While the use of four sets of blades around an axially extending collar is given as an example, other configurations can be used such as triangular, rectangular, pentagonal, hexagonal, and so on.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
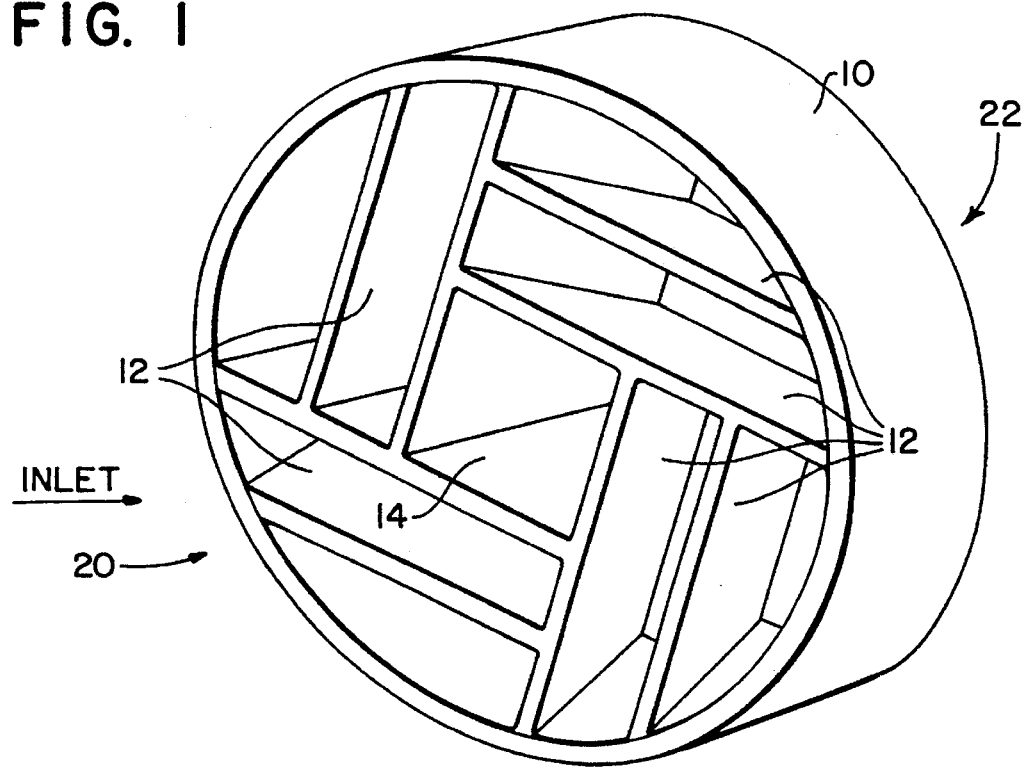
FIG. 1 is a perspective view of the front (inlet) of the impeller according to one embodiment of the invention.

Referring to the drawings in particular, FIG. 1 shows an impeller of the invention having housing 10 surrounding a plurality of sets of blades 12. The blades 12 extend from fuel inlet side 20 to fuel outlet side 22 through the housing 10. The blades 12 are angled in a manner that directs the pulverized coal and primary air mixture inwardly toward the longitudinal axis of the housing 10, e.g. an angle of about 20° relative to the longitudinal axis. As a result, a recess 14 is formed on the fuel inlet side 20 of the impeller. The spacing of the blades 12 from each other can also vary. As an example for illustrative purposes only, the impeller assembly has an internal diameter of about 11¼ inches. The innermost blade 12 is at an angle of about 20° and about 1½" from the center longitudinal axis. The next blade 12 is positioned at about a 20° angle also and about 3⅜ inches from the longitudinal axis. The third blade 12 is at the same angle and about 5¼ inches from the center axis.

Figure 2:
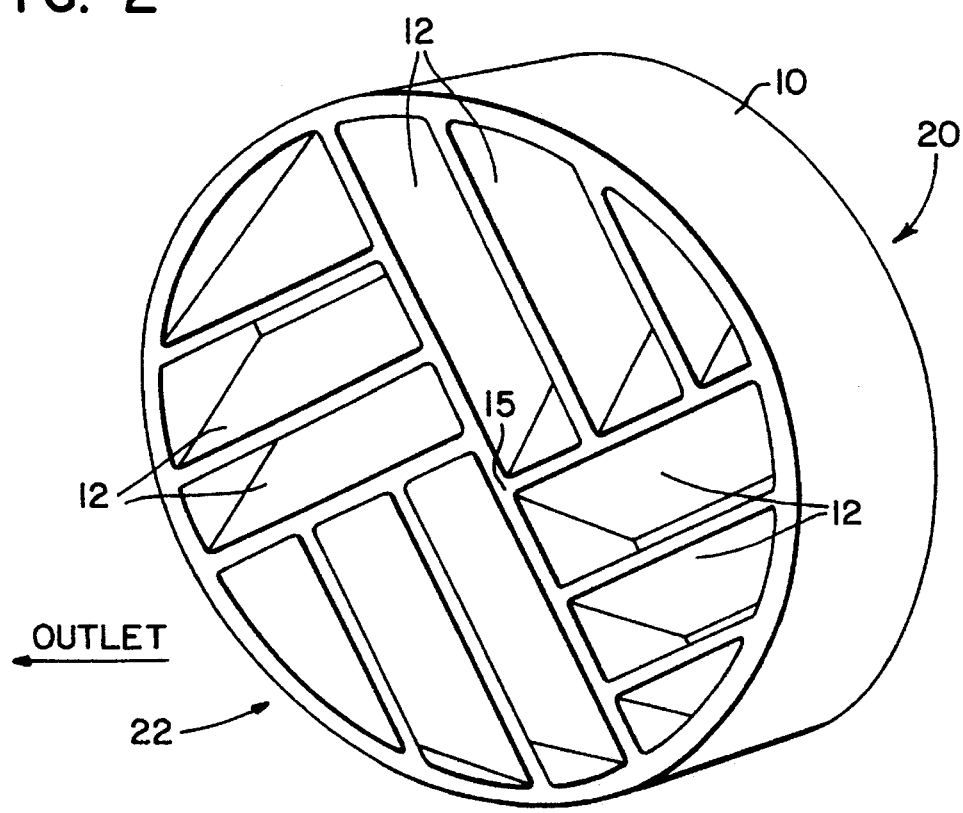
FIG. 2 is a perspective view of the rear (outlet) of the impeller.

FIG. 2 shows the outlet side 22 of the impeller in greater detail. The blades 12 can be seen converging to a center point 15 in the center of the housing 10 because of the angled orientation which they have inside the housing 10.

While the drawings show orientations of blades set in four quadrants or groups it is envisioned that any number of sets of blades can be used within the housing 10. That is, the shape of the recess 14 of FIG. 1 need not necessarily be square but could be triangular, pentagonal, hexagonal and so on depending on the number of sets of blades 12 used.

Further, the housing 10 need not necessarily be cylindrical but could be a quadrilateral, hexagon or other advantageous shape to be used in conjunction with a varying number of sets of blades.

Additionally, the number of blades 12 shown in the figures is not intended to be limiting on the scope of the invention either. It is foreseen that any number of blades 12 could be used in each segment of the housing 10.

Figure 3:
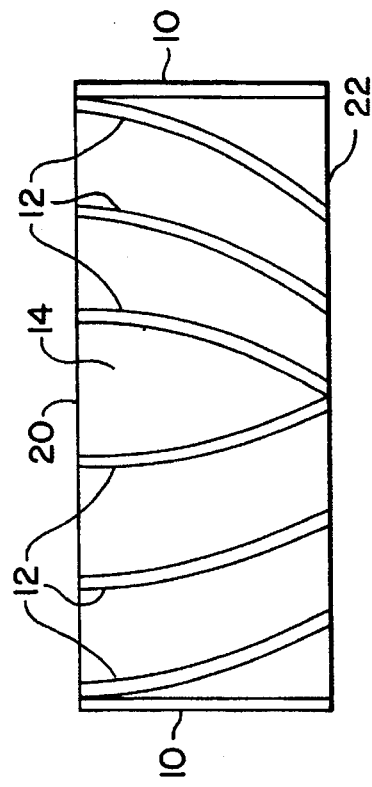
FIG. 3 is a sectional view of another embodiment of the invention.

Returning to the drawings, in FIG. 3, an alternate embodiment of the invention is shown in which the blades 12 are curved rather than planar, as shown in FIGS. 1 and 2. The blades 12 are still located between inlet side 20 and outlet side 22. It can be seen that blades 12 still form a recess 14 between them.

Figure 4:
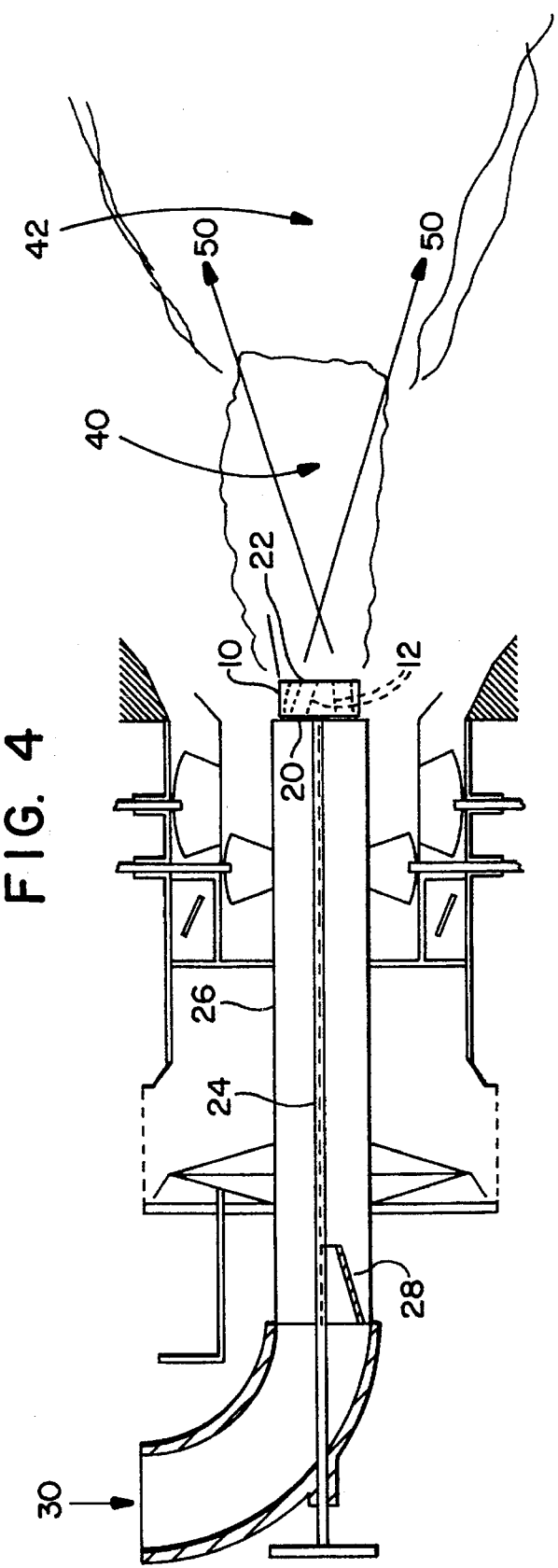
FIG. 4 is a schematic view showing the invention in relation to a furnace.

FIG. 4 schematically illustrates a burner nozzle 26 having the impeller housing 10 with blades 12 placed at an outlet end. The housing 10 containing the blades 12 is connected via a impeller shaft 24 which may be advantageously connected at recess 14 between blades 12. The impeller shaft 24 is rotatably connected to the nozzle for rotation about the longitudinal axis. The shaft 24 is also connected to the housing 10. In this environment, pulverized coal and air 30 are provided to the burner nozzle 26 and must pass through housing 10 and past blades 12. Burner nozzle 26 also has distribution cone 28 located upstream of the impeller housing 10.

The effect of blades 12 within housing 10 is to cause the pulverized coal and air mixture 30 to exit the impeller at outlet side 22 in separated flow directions 50. The pulverized coal and air mixture passing through housing 10 directed by blades 12 is separated into the individual flows 50 which do not intersect each other and thus do not mix after passing outlet side 22 but remain in separate directed streams. The streams are oriented obliquely to the longitudinal axes of the housing 10 and coal nozzle 26. The separated flows 50 create a fuel-rich devolatilization zone 40 and air-rich char burn out zone 42.

While specific embodiments of the invention have been shown and described in detail to illustrate the application of the principles of the invention, it will be understood that the invention may be embodied otherwise without departing from such principles.

What is claimed is:

1. A low $NO_x$ coal burner with impeller for a furnace comprising:

a pulverized coal burner nozzle having a longitudinal axis, and being for connection to a pulverized coal and primary air supply, the nozzle having an outlet end;

a housing defining a passage with a first end, a second end and a longitudinal axis;

attachment means for attaching the housing to the coal outlet end of the coal nozzle with the longitudinal axis of the housing being collinear with the longitudinal axis of the coal nozzle; and an impeller situated in the second end of the housing passage for redirecting the pulverized coal and primary air supply into a plurality of non-intersecting flows, each directed obliquely toward the longitudinal axis of the housing, said impeller including a housing with a plurality of sets of blades for each flow, each set of blades being oriented within the impeller housing, each set of blades extending at an acute angle to the longitudinal axis.

2. A coal burner with impeller according to claim 1, wherein there are four sets of blades for creating four flows.

3. A coal burner with impeller according to claim 1, wherein the attachment means is a shaft rotatably connected to the nozzle for rotation about the longitudinal axis, the shaft being connected to the housing.

4. A coal burner with impeller according to claim 3, wherein the impeller comprises a plurality of sets of planar blades for each flow, each set of blades being oriented within the housing between the first and second ends and extending at an acute angle to the longitudinal axis.

5. A coal burner with impeller according to claim 4, wherein the attachment means comprises an elongated shaft oriented within the burner nozzle along the longitudinal axis, the shaft having a first end connected to the blades at a recess formed by said blades, and a second end outside the burner nozzle for being connected to a means for rotating.

6. A coal burner with impeller according to claim 5, wherein there are four sets of blades for creating four flows.

7. A low $NO_x$ coal burner with impeller for a furnace comprising:

a pulverized coal burner nozzle having a longitudinal axis, and being for connection to a pulverized coal and primary air supply, the nozzle having an outlet end;

a housing defining a passage with a first end, a second end and a longitudinal axis;

attachment means for attaching the housing to the coal outlet end of the coal nozzle with the longitudinal axis of the housing being collinear with the longitudinal axis of the coal nozzle; and an impeller situated in the second end of the housing passage for redirecting the pulverized coal and primary air supply into a plurality of non-intersecting flows, each directed obliquely toward the longitudinal axis of the housing, said impeller including a housing with a plurality of sets of blades for each flow, each set of blades being oriented within the impeller housing, each set of blades extending at an acute angle to the longitudinal axis, at least one of the plurality of blades is curved relative to the longitudinal axis.

8. A coal burner with impeller according to claim 7, wherein there are four sets of blades for creating four flows in the passage.

* * * * *